(12) United States Patent
Mattson et al.

(10) Patent No.: US 6,419,973 B1
(45) Date of Patent: Jul. 16, 2002

(54) PROCESS FOR PREPARING CORN BASED FRENCH FRY STRIPS

(75) Inventors: Peter H. Mattson, Hillsborough; John K. Fukushima, Fairfield, both of CA (US); Bruce T. Pittard, Caldwell, ID (US); David B. Walker, Meridian, ID (US); Antonio Vasquez, Caldwell, ID (US)

(73) Assignee: J. R. Simplot Company, Boise, ID (US)

( * ) Notice: Subject to any disclaimer, the term of this patent is extended or adjusted under 35 U.S.C. 154(b) by 0 days.

(21) Appl. No.: 09/627,487

(22) Filed: Jul. 28, 2000

Related U.S. Application Data

(60) Provisional application No. 60/146,565, filed on Jul. 30, 1999, and provisional application No. 60/200,553, filed on Apr. 28, 2000.

(51) Int. Cl.[7] .................................................. A23L 1/10
(52) U.S. Cl. ........................ 426/560; 426/516; 426/524; 426/549; 426/615; 426/808
(58) Field of Search .................................. 426/524, 102, 426/560, 808, 516, 615, 549

(56) References Cited

U.S. PATENT DOCUMENTS

| | | |
|---|---|---|
| 3,917,851 A | 11/1975 | Arnaud et al. |
| 4,238,517 A | 12/1980 | Bosley, Jr. et al. |
| 4,293,582 A | 10/1981 | Hamann et al. |
| 4,302,478 A | 11/1981 | Hamann et al. |
| 4,645,679 A | 2/1987 | Lee, III et al. |
| 4,769,253 A | 9/1988 | Willard |
| 4,834,996 A | 5/1989 | Fazzolare et al. |
| 4,879,126 A | 11/1989 | Willard et al. |
| 5,100,686 A | 3/1992 | Hunt et al. |
| 5,225,224 A | 7/1993 | VanNortwick |
| 5,320,858 A | 6/1994 | Fazzolare et al. |
| 5,458,900 A | 10/1995 | Rubio et al. |
| 5,540,140 A | 7/1996 | Rubio et al. |
| 5,554,405 A | 9/1996 | Fazzolare et al. |
| 5,558,886 A | 9/1996 | Martinez-Bustos et al. |
| 5,673,609 A | 10/1997 | Sanchez et al. |
| 5,846,589 A | 12/1998 | Baker et al. |

*Primary Examiner*—Lien Tran
(74) *Attorney, Agent, or Firm*—Kelly Bauersfeld Lowry & Kelley, LLP

(57) ABSTRACT

French fry strips and a related preparation process are provided, wherein the strips are produced from a corn based dough. The corn based dough comprises a matrix of corn meal and corn flour of different particle or granule sizes, admixed with water and optional flavoring and seasoning constituents to form a relatively thick dough having a texture suitable for extruding and cutting to form elongated strips having a size and shape conforming generally to conventional potato-based French fries. The formed and cut corn dough strips may be parfried in hot oil, and then frozen. The frozen corn strips are subsequently finished prepared for consumption, preferably by finish frying in hot oil. The finish prepared corn strips have a corn snack taste in combination with a texture defined by a crispy exterior surface encasing a moist and mealy interior.

54 Claims, No Drawings

PROCESS FOR PREPARING CORN BASED FRENCH FRY STRIPS

This application claims the benefit of provisional application No. 60/146,565, filed Jul. 30, 1999, and No. 60/200,553, filed Apr. 28, 2000.

BACKGROUND OF THE INVENTION

This invention relates generally to a new type of French fry product adapted for initial preparation by forming, optional parfrying and freezing, and for subsequent finish preparation preferably by finish frying in hot oil. More specifically, this invention relates to French fry strips formed from a corn based dough, to provide a food product having a corn snack taste in combination with an overall texture and appearance simulative of conventional potato-based French fry strips.

Potato-based French fries are widely available in the foods industry. These potato products are conventionally prepared by cutting whole potatoes into elongated strips of a desired size and shape, and then partially cooking the potato strips by blanching in hot water or steam. Thereafter, the potato strips are partially fried, or parfried, in hot cooking oil, followed by freezing for packaging, shipping and/or storage. Prior to consumption, the parfried and frozen potato strips are reconstituted or finish prepared typically by finish frying in hot oil, or by alternative finish preparation methods such as heating in a conventional or convection oven, or by heating in a microwave oven. French fried potato strips of this type are utilized extensively in a broad range of restaurant and food service operations, and are also sold extensively through retail establishments for in-home finish preparation. In the parfried and frozen state, the potato strips have a substantial moisture content on the order of about 50% to about 70% by weight, depending upon the specific strip cut size and the particular parfry processing parameters. In the finish prepared state, the French fry potato strips typically have a still-substantial moisture content on the order of about 35% to about 50% by weight.

Chip-type food products such as potato chips and corn chips and the like are also well known in the food industry for use as snack items or as a relatively informal side dish used typically with sandwiches and the like. These chip products are formed from cut raw products or from processed doughs to provide a chip of a desired size and shape, having a substantially dry character typified by a normal finished moisture content of less than about 5% by weight. This low moisture content for chip-type food products provides a significant point of differentiation from higher moisture French fried potato strip products, in terms of overall taste, texture, and related consumer perception.

While French fried potato strips and chip-type snack food products enjoy substantial consumer acceptance in their respective segments of the foods industry market, there exists an on-going demand for new and unique food products. In this regard, the present invention is directed to French fry strips formed from a corn based dough, and a related preparation process, to provide a new and unique French fry strip product having a corn chip snack taste in combination with an overall texture and appearance simulative of conventional potato-based French fry strips.

SUMMARY OF THE INVENTION

In accordance with the invention, corn based French fry strips and a related preparation process are provided, wherein the strips are prepared from a corn based dough. The corn based dough comprises a blended matrix of corn meal and corn flour having a range of different particle or granule sizes, admixed with water and optional flavoring and seasoning and conditioning ingredients to form a relatively thick dough. This corn based dough is suitably shaped as by extruding and cutting to form elongated strips having a size and shape conforming generally to conventional potato-based French fries. In one preferred process, the formed and cut corn dough strips are parfried in hot oil, and then frozen. The frozen corn strips are subsequently finished prepared for consumption, preferably by finish frying in hot oil. The finish prepared corn strips have a corn snack taste in combination with a texture defined by a crispy exterior surface encasing a moist and mealy interior.

More specifically, in one preferred form of the invention, dry ingredients for the corn based dough are preblended to include corn meal (polenta) together with relatively course corn flour (masa). To these primary constituents, additional optional flavoring and seasoning agents such as salt, sugar and flavor additives such as tortilla and jalapeno flavorings may be added in minor or trace amounts. These preblended dry ingredients are then mixed with unheated and preferably relatively cold water at a temperature of about 40–85° F. In the wet state, water is present in a range of from about 50% to about 75% by weight, and preferably about 67–72% by weight. Corn meal (polenta) is present in the wet state in a range of from about 0% to about 15% by weight, and preferably about 2–4% by weight. Similarly, in the wet state, corn flour (masa) is present in a range of from about 10% to about 30% by weight, and preferably about 23–25% by weight.

The dry ingredients are mixed in the water while elevating the temperature to at least about 170° F. and preferably to a temperature of about 180–185° F., without boiling. During this mixing and heating cycle, the corn meal and corn flour constituents expand or swell to progressively increase the thickness of the resultant dough. The corn based dough is then shaped into elongated French fry strips having a cross sectional size and shape, and a distribution of strips lengths typical for French fry strips cut from raw potatoes. In a preferred process, this shaping step takes place by extruding or sheeting the dough through one or more dies of appropriate size and shape to produce elongated dough lengths or ropes which can be cut to suitable length strips. The corn dough ropes are cooled by air to achieve an internal temperature of about 70–125° F. to reduce product stickiness while increasing product stiffness. A similar cooling step may also be used prior to extruding or sheeting of the dough. The temperature conditioned ropes are then cut into strips resembling traditional potato-based French fries.

In accordance with one preferred preparation process, these corn dough strips are then partially fried, or parfried, in hot oil at a temperature of about 300–400° F., and preferably about 370–390° F., for a period of about 30–150 seconds, and preferably about 40–120 seconds. In one process variation, these corn dough strips may be frozen prior to parfrying and then placed into the hot oil for parfrying while still in the frozen state. The parfried strips are removed from the frying oil and may be surface-sprayed with a light mist of water in an amount sufficient to increase the strip weight by up to about 5%, and preferably about 2–3%. The parfried corn strips are then promptly frozen at a temperature of about 0° F. or below followed by packaging for shipment and/or storage. In the parfried and frozen state, the corn strips have a strip moisture content within a range of from about 40% to about 68% by weight, and preferably about 62% by weight.

In another preferred preparation process, the formed corn dough strips are frozen for shipment and/or storage without parfrying. In this process, the frozen corn strips have a strip moisture content within a range of from about 68% to about 74% by weight, and preferably about 72% by weight.

The frozen corn strips are subsequently finished prepared for consumption, preferably by finish frying in hot oil. Alternative finish preparation methods, particularly with respect to corn strips which have been parfried, may include heating in a conventional oven, a convection oven, or an air impingement oven. The corn strips may also be finish prepared in a microwave oven, preferably by heating the strips on a susceptor board to maintain external strip crispness. The finish prepared corn strips have a corn snack taste in combination with a texture defined by a crispy exterior surface encasing a moist and corn mealy interior. In the finish prepared state, the corn strips have a moisture content in the range of from about 30% to about 50% by weight, and preferably about 35% by weight.

Other features and advantages of the invention will become more apparent from the following detailed description.

DETAILED DESCRIPTION OF THE PREFERRED EMBODIMENT

The present invention relates to corn based French fry strips, and to a preparation process for forming and freezing such French fry strips for subsequent finish preparation as by finish frying or by other finish preparation methods. The corn based French fry strips are formed from a corn based dough comprising a matrix of corn meal (polenta) and corn flour (masa) mixed with water and then shaped as by extruding and cutting into elongated strips having a cross sectional size and shape together with a length or distribution of lengths resembling conventional French fry strips cut from raw potatoes. These corn dough strips are optionally parfried and frozen for subsequent finish preparation immediately prior to consumption.

In general terms, the corn based dough comprises the combined corn meal and corn flour matrix having particles or granules of a range of different physical sizes. In this regard, the corn meal is typically provided with a granule size significantly larger than the corn flour granule size. These two granular corn constituents are preblended preferably in dry form with selected additional seasonings and flavorings in minor amounts. The dry ingredients are then mixed with water to produce a relatively thick and somewhat pasty dough having a consistency suitable for extrusion or sheeting into elongated dough lengths or ropes which can then be cut into individual strips of appropriate length. Alternately, the corn based dough can be extruded into the form of a sheet of selected thickness which is then subdivided by cutting into elongated individual strips of appropriate length. In the preferred form, the corn dough strips have a cross sectional size and shape, and a distribution of lengths corresponding to conventional French fry potato strips. In this regard, in one preferred form, the corn dough strips have a so-called shoestring cut size with a generally square cross sectional shape measuring about 0.3 inch in width on each side, and a length distribution ranging from about 2–6 inches. It will be recognized and understood, however, that other strips sizes may be formed, and further that alternative French fry shapes other than a shape corresponding with traditional fresh-cut French fried potatoes may be formed.

These corn dough strips are, in accordance with preferred preparation processes, subjected to at least one parfry step in hot oil to partially cook the strips and to form a relatively crispy fried exterior surface thereon. The parfry step is of relatively short duration, about 30–150 seconds at a temperature of about 300–400° F. A vegetable oil, such as a soy-based oil, is preferred. However, it will be recognized and understood that other cooking oils may be used, such as any of a wide range of natural and synthetic fats or oils as well as fat substitutes which may be fully or partly indigestible.

The parfried corn dough strips are removed from the hot oil and then frozen as by blast freezing in a typical commercial blast freezer at about 0° F. to about −20° F. In one preferred process, immediately following the parfry step and preceding the freezing step, the corn dough strips are surface-sprayed with a fine mist of water. This surface-spray of water is believed to re-hydrate corn starches present on the exterior surfaces of the strips, wherein some of these corn starches may dehydrate during exposure to parfry temperatures and result in undesirable surface "blooming" or discoloration of the strips upon finish preparation particularly by way of finish frying. Re-hydration of these corn starches with the post-parfry surface spray of water reduces or eliminates this undesirable "blooming" phenomena. This surface-spray step is optional, and may not be required in the case of strips which have been parfried for a relatively short time or at a relatively low frying temperature, in which case such parfried strips will encounter a lesser degree of dehydration of surface starches. The strips are then frozen by suitable methods which may include ammonia type, impingement type, or cryogenic freezing. The parfried and frozen corn strips are then packaged in a normal manner for shipment and/or storage in the frozen state, awaiting finish preparation for consumption. In the parfried and frozen state, the French fried corn strips exhibit a moisture content within the range of about 40% to about 68%, and more preferably about 62% by weight.

For finish preparation, the parfried and frozen corn strips are reconstituted preferably by finish frying in hot oil at a temperature of about 340–365° F., and for a time period of about 150–300 seconds. In the finish prepared state, the corn strips exhibit an overall physical appearance resembling traditional French fried potato strips, except for a more granular exterior surface and a somewhat darker or deeper golden brown exterior color resembling a corn-based snack chip. Texturally, the finish prepared strips have a tender yet crispy and crunchy exterior surface encasing a hot and somewhat creamy or corn mealy interior. In this finish prepared state, the corn strips have a moisture content of about 30% to about 50% by weight, and preferably about 35% by weight, and an oil content of about 15% to about 20% by weight.

The following Table 1 sets forth one preferred corn dough formulation example used to demonstrate the invention (the inclusion of the tortilla flavoring constituent being optional), together with preferred formulation ranges (in % by weight) for the dough constituents to produce the corn based French fry strips of the present invention:

TABLE 1

|  | DRY % | WET % | WET % RANGE |
| --- | --- | --- | --- |
| Water | — | 71.8% | 50%–75% |
| Corn Chip Mix #8 (Masa; Corn Flour) | 81.1% | 22.9% | 10%–30% |
| Polenta (Corn Meal) | 9.7% | 2.7% | 0%–15% |
| Sugar | 5.3% | 1.5% | 0%–3% |

TABLE 1-continued

| | DRY % | WET % | WET % RANGE |
|---|---|---|---|
| Salt | 3.6% | 1% | 0%–3% |
| Tortilla Flavor (optional) | 0.3% | 0.1% | trace % |

The corn chip mix #8 comprises a commercially available corn flour (masa), in the form of whole kernel corn which has been cooked, steeped in lime water, and then stone ground, dried and sifted to a relatively large particle or granule size. Such corn chip mix #8 is available, for example, from Valley Grain Products of Madera, Calif. The polenta comprises cracked and degermed corn meal available, for example, from Giusto's Specialty Foods of San Francisco, Calif., under the product designation Corn Meal Coarse.

The dry ingredients for the corn based dough are preblended in dry form and then added to the water. In the preferred process, the water is unheated and preferably cold, having a temperature of about 40–85° F. Such unheated water is used to minimize or prevent premature swelling of the corn ingredients. This mixing step desirably takes place in a mixing vessel suitable for applying heat to the dough during mixing, such as a steam jacketed swept surface mixer of the type available from Groen Company of Elk Grove Village, Ill. During the mixing step, the temperature of the corn based dough is elevated to a temperature of at least 170° F. and more preferably about 180–185° F., typically over a mixing time of about 4 minutes to about 10 minutes. At the conclusion of the mixing step, the dough has a relatively thick and somewhat pasty or sticky consistency yet retains sufficient physical integrity to accommodate shaping by extruding and cutting or the like. In this regard, it is desirable to maintain the water temperature below the boiling point and preferably below about 185° F. to prevent the dough from developing a dough consistency that is too pasty and sticky and thus unsuitable for subsequent extrusion and cutting into strips.

In the demonstration example as set forth in Table 1, the preblended dry ingredients were mixed in water in the Groen steam jacketed mixer wherein the water temperature was raised from about 65° F. to about 183° F. over a mixing time of 5 minutes. In an alternative mixing process designed for continuous processing, the mixing step may take place using a stainless steel swept surface heat exchanger such as that available from APV-USA of Seattle, Wash. In continuous processing, the mixing/heating step may be reduced, e.g., about 60–120 seconds, in which the product is in actual contact with the heating vessel. Holding tubes are optional to continue swelling of starches. Holding tube times may range from about 1 minute to about 15 minutes.

The corn dough is removed from the mixing step and extruded through one or more extrusion dies into the shape of elongated dough lengths or ropes of selected cross sectional size and shape. Prior to forming the elongated dough ropes, the corn dough optionally may be conditioned by cooling or chilling to enhance stiffness and to reduce stickiness, as by subjecting the dough to a cool air flow to reduce the temperature to less than about 125° F. without freezing. In the demonstration example, these dough ropes were extruded to have a generally rectangular cross sectional shape with dimensions of about ⅜×⅜ inch, and the extrusion and cutting step was performed using a Vemag extrusion device, available from Robert Reiser and Company, Inc., of Canton, Mass. However, it will be recognized and understood that alternative dough shaping apparatus may be used, such as the extrusion device shown and described in U.S. Pat. No. 4,302,478. As a further alternative, the corn dough can be extruded into the form of a sheet of selected thickness, and then cut into the elongated dough lengths or ropes for further subdivision into individual strips of selected or variable lengths.

The corn dough ropes are then subjected to a short air drying or conditioning step, during which they are exposed to an ambient or cool air flow for at least about 30 seconds. During this air dry step, the corn dough is allowed to set and partially stiffen and/or reduce dough stickiness attributable to starch retrogradation, to insure retention of structural integrity upon subsequent processing. In the demonstration example, the extruded dough ropes were subjected to a cool air flow sufficient to cool to an internal temperature of about 70–125° F., and preferably about 85° F.

The dough lengths or ropes were then cut into individual strips having a variable length distribution within the range of about 2–6 inches to provide elongated strips having an overall size and shape resembling French fry strips cut from raw potatoes. A variety of cutting equipment can be used, such as the cutting device shown and described in U.S. Pat. No. 4,334,447.

Additional conditioning of the dough may occur prior to or following cutting of the dough ropes into individual strips. Such additional conditioning further reduces dough stickiness which could otherwise undesirably contribute to the strips sticking together during subsequent processing. In one preferred process, the strips are substantially cooled as by conveyance on a belt through a blast freezer at a temperature of less than about 0° F., and a residence time of about 2–4 minutes. Alternately, the strips may be frozen throughout.

In accordance with one preferred preparation process, the corn dough strips are then parfried in hot oil, preferably a soy-based vegetable oil, at a temperature of about 300–400° F. for about 30–145 seconds. In one demonstration example, the strips in an unfrozen state were parfried at a temperature of about 370–375° F. for about 90 seconds. At the conclusion of this parfry step, the strips are removed from the hot oil, allowed to stand briefly to drain excess oil therefrom, and then surface-sprayed with a light water mist at room temperature to achieve water uptake of up to about 5% by weight, and preferably about 2% by weight.

The parfried corn dough strips are then frozen for packaging, and for shipment and/or storage to await finish preparation for consumption. Freezing of the strips takes place in a commercial blast freezer at a temperature of less than about 0° F., and more preferably about −20° F. In the parfried and frozen state, the corn dough strips of the demonstration example had a moisture content of about 55% by weight and an oil content of about 10% by weight.

For finish preparation, the parfried and frozen corn dough strips are preferably finish fried in hot oil such as soy-based vegetable oil or the like at a temperature of about 340–365° F., for a time period of about 150–300 seconds. In the demonstration example described above, the corn dough strips were placed in a fryer while still in the frozen state, and finish fried at a temperature of about 350° F. for about 180 seconds. The finished fried strips were then removed from the fryer, allowed to stand for about 5 minutes under an infrared lamp, and then promptly served for eating. In the finish fried state, the corn strips of the demonstration example had a moisture content of about 37% by weight.

In an alternative preferred demonstration example, the formed corn dough strips are frozen prior to parfrying, and the post-parfry water surface spray step is eliminated. In this process, the strips may be frozen throughout in a commercial blast freezer, or alternately may be surface-frozen on exterior surfaces thereof as by placing the strips in a commercial blast freezer at a temperature of less than about 0° F., for a period of about 4 minutes. The thus-frozen corn dough strips are placed into hot oil for parfrying while still in the frozen state, preferably without prior thawing. Specifically, the formed and frozen strips are parfried at a temperature of about 370–375° F., using a time range of about 40–120 seconds, followed by final freezing as previously described for packaging, shipment and/or storage. For final preparation, these corn strip strips are preferably finish fried by placing the strips while in the frozen state into hot oil at a temperature of about 350° F., for about 240 seconds. It will be recognized, however, that the finish preparation oil temperature and frying time may vary.

In another alternative preferred embodiment of the invention, the formed corn dough strips are frozen for packaging, shipment and/or storage without parfrying. In this example, the formed and frozen corn dough strips are finish prepared preferably by finish frying by placing the strips while still in the frozen state into hot oil at a temperature of about 350° F. for about 240 seconds.

In the finish prepared state, the corn based French fry strips of the present invention exhibit a crispy and crunchy yet relatively tender exterior fried surface skin, similar to conventional French fried potato strips, together with a moist and mealy interior structure which is again similar to conventional French fried potato strips. However, the corn based strips also exhibit a somewhat darker and more golden brown exterior color in combination with a distinctive corn flavor and texture during mastication, similar to a conventional dry corn snack chip. The exterior surface of the finish fried strips additionally exhibit a longer post-preparation holding time while retaining desirable crispy and crunchy characteristics, in comparison with conventional French fried potato strips. Freezing of the strips prior to frying and placement of the strips while still in the frozen state into hot oil for frying, either parfrying or finish frying, significantly reduces any tendency of the dough-based strips to stick or clump together at the conclusion of the frying step.

A variety of modifications in and to the formulation of the corn based dough and the related processing parameters are possible, without varying from the spirit and scope of the invention. For example, a range of additives may be employed in the dough formulation, such as various modified food starches in minor amounts (less than about 5% by weight) to enhance the smoothness of the dough and/or to improve the internal moist and mealy character of the finish prepared corn strips. It is also possible to add polenta or starches in a proportion up to 50% and more by weight of the corn flour (masa), and/or to replace a portion of the corn flour (masa) with polenta or starches to make a corn fry type product. Vegetable oil, including but not limited to corn-based oils may also be added to the dry ingredients, or subsequently during mixing with water, to increase the ability to undergo finish preparation in an oven, and/or to adjust final textural characteristics. Alternative corn meal and corn flour products may also be used in lieu of or in addition to the ingredients stated in the demonstration example. For example, a different corn flour such as corn chip mix #4 (available from Valley Grain Products of Madera, Calif.) may be used having a smaller granule size and formed from a higher proportion of white corn as opposed to yellow corn kernels. Still further, a wide variety of flavorings and seasonings and the like may be used, such as pepper bits, cheese flavorings, and other natural and artificial flavorings and colorings. By contrast, however, unacceptable additives of the type used in many processed food products include, for example, lecithin and leavening agents.

Alternative processes include spraying the extruded and cut corn dough strips with a light coat of cooking oil prior to parfrying to improve suitability for oven finish preparation. In addition, the parfried corn dough strips can be dipped in water at the conclusion of the parfry step, in lieu of surface-spray water application as described with respect to one demonstration example. A variety of finish preparation methods can be used, such as heating the parfried and frozen corn strips in a conventional oven, in a convection oven, in an air impingement oven, or in a microwave oven. It will also be understood that other corn dough shapes, in addition to the elongated strips as described, can be formed and processed by parfrying and freezing to provide a French fried corn based food product.

A variety of further modifications and improvements in and to the corn based French fry strips and related preparation process of the present invention will be apparent to those persons skilled in the art. Accordingly, no limitation on the invention is intended by way of the foregoing description except as set forth in the appended claims.

What is claimed is:

1. A process for preparing corn based French fry food products, said process comprising the steps of:

preparing a corn based dough by mixing at least one granular corn constituent consisting essentially of corn flour and corn meal and mixtures thereof with water at a temperature such that the water does not boil;

forming the corn based dough into individually shaped food products; and freezing the individually shaped food products.

2. The process of claim 1 wherein said dough preparing step comprises mixing two corn constituents having different granule sizes with water.

3. The process of claim 2 wherein the two corn constituents comprise corn flour and corn meal.

4. The process of claim 1 wherein said dough preparing step comprises mixing about 10% to about 30% by weight corn flour and about 0% to about 15% by weight corn meal with about 50% to about 75% by weight water to form the corn based dough.

5. The process of claim 4 wherein the corn based dough comprises from about 23% to about 25% by weight corn flour, and from about 2% to about 4% by weight corn meal.

6. The process of claim 4 wherein said dough preparing step further comprises mixing a minor proportion of flavoring ingredients.

7. The process of claim 4 wherein said dough preparing step further comprises initially adding the corn flour and corn meal to water, and then elevating the water temperature to at least about 170° F.

8. The process of claim 7 wherein said dough preparing step comprises elevating the water temperature to from about 180° F. to about 185° F.

9. The process of claim 7 wherein said step of adding the corn flour and the corn meal to water includes the step of providing the water with an initial relatively cool temperature of from about 40° F. to about 85° F.

10. The process of claim 1 wherein said dough forming step comprises shaping the corn based dough into elongated French fry strips having a size and shape resembling French fry strips cut from raw potatoes.

11. The process of claim 1 further including the step of frying the shaped food products in hot oil.

12. The process of claim 11 wherein said frying step comprises a finish preparation frying step in hot oil at a temperature of from about 340° F. to about 365° F., for a time of from about 150 to about 300 seconds.

13. The process of claim 11 wherein said frying step comprises a finish preparation frying step in hot oil to produce finish fried food products having a moisture content of from about 30% to about 50% by weight.

14. The process of claim 13 wherein the finish fried food products have a moisture content of from about 35% to about 37% by weight.

15. The process of claim 11 wherein said frying step comprises a parfry step in hot oil at a temperature of from about 300° F. to about 400° F., for a time of from about 30 to about 150 seconds.

16. The process of claim 15 wherein said frying step comprises a parfry step in hot oil at a temperature of from about 370° F. to about 390° F., for a time of from about 40 to about 120 seconds.

17. The process of claim 11 wherein said frying step comprises a parfry step in hot oil to produce parfried food products having a moisture content in a parfried and frozen state of from about 40% by weight to about 68% by weight.

18. The process of claim 15 wherein said parfry step precedes said freezing step.

19. The process of claim 18 wherein said frying step comprises a parfry step in hot oil to produce parfried food products having a moisture content in a parfried and frozen state of from about 50% by weight to about 62% by weight.

20. The process of claim 15 further including the step of rehydrating exterior surfaces of the parfried food products.

21. The process of claim 20 wherein said rehydrating step comprises applying water to exterior surfaces of the parfried food products in an amount up to about 5% by weight.

22. The process of claim 20 wherein said rehydrating step comprises applying water to exterior surfaces of the parfried food products in an amount of from about 2% to about 3% by weight.

23. The process of claim 1 further including the step of cooling the corn based dough prior to said dough forming step.

24. The process of claim 23 wherein said cooling step comprises reducing the temperature of the corn based dough to less than about 125° F.

25. The process of claim 15 further including the step of cooling the individually shaped food products prior to said parfry step.

26. The process of claim 25 wherein said cooling step comprises reducing the temperature of the individually shaped food products to less than about 125° F.

27. The process of claim 25 wherein said cooling step comprises reducing the temperature of the individually shaped food products to about 85° F.

28. The process of claim 25 wherein said cooling step comprises freezing at least the exterior surfaces of the individually shaped food products, and further wherein said parfry step comprises placing the food products into hot oil without prior thawing.

29. The process of claim 1 wherein said dough forming step comprises extruding the corn based dough into an elongated shape, reducing the temperature of the extruded dough to less than about 125° F. without freezing, cutting the extruded dough into elongated strips, and freezing at least the exterior surfaces of the strips.

30. The process of claim 18 further including the step of finish preparing the parfried and frozen food products by any one of finish frying, oven heating, and microwave heating, to produce finish prepared food products having a moisture content of from about 30% to about 50% by weight.

31. The process of claim 30 wherein the finish prepared food products have a moisture content of from about 35% to about 37% by weight.

32. The process of claim 18 further including the step of finish preparing the parfried and frozen products by finish frying in hot oil at a temperature of from about 340° F. to about 365° F., for a time of from about 150 to about 300 seconds.

33. A process for preparing corn based French fry strips, said process comprising the steps of:
   preparing a corn based dough by mixing about 10% to about 30% by weight dry granular corn flour and about 0% to about 15% by weight dry granular corn meal having different granular sizes with about 50% to about 75% by weight water at an initial temperature of from about 40° F. to about 85° F., and mixing these constituents while elevating the temperature thereof to at least about 170° F. but such that the water does not boil;
   extruding and cutting the corn based dough into elongated French fry strips having a size and shape resembling French fry strips cut from raw potatoes;
   parfrying the French fry strips in hot oil at a temperature of from about 300° F. to about 400° F., for a time of from about 30 to about 150 seconds; and
   freezing the parfried strips, said parfried and frozen strips having a moisture content of from about 40% by weight to about 68% by weight.

34. The process of claim 33 wherein the corn based dough comprises from about 23% to about 25% corn flour, and from about 2% to about 4% corn meal.

35. The process of claim 33 wherein said dough preparing step comprises elevating the temperature of the constituents to a temperature of from about 180° F. to about 185° F.

36. The process of claim 33 wherein said parfrying step comprises parfrying the strips in hot oil at a temperature of from about 370° F. to about 390° F., for a time of from about 40 to about 120 seconds.

37. The process of claim 33 wherein said parfried and frozen strips have a moisture content of from about 50% by weight to about 62% by weight.

38. The process of claim 33 further including the step of cooling the corn based dough prior to said extruding and cutting step.

39. The process of claim 33 wherein said cooling step comprises reducing the temperature of the dough to less than about 125° F.

40. The process of claim 33 further including the step of cooling the strips prior to said parfrying step.

41. The process of claim 40 wherein said cooling step comprises reducing the temperature of the strips to less than about 125° F.

42. The process of claim 40 wherein said cooling step comprises freezing at least the exterior surfaces of the strips, and further wherein said parfrying step comprises placing the food products into hot oil without prior thawing.

43. The process of claim 33 wherein said extruding and cutting step comprises extruding the corn based dough into an elongated shape, reducing the temperature of the extruded dough to less than about 125° F. without freezing, cutting the extruded dough into elongated strips, and freezing at least the exterior surfaces of the strips.

44. The process of claim 33 further including the step of rehydrating exterior surfaces of the parfried food products.

45. The process of claim 44 wherein said rehydrating step comprises applying water by misting to exterior surfaces of the parfried food products in an amount up to about 5% by weight.

46. The process of claim 33 further including the step of finish preparing the parfried and frozen strips by any one of finish frying, oven heating, and microwave heating, to produce finish prepared strips having a moisture content of from about 30% to about 50% by weight.

47. The process of claim 46 wherein the finish prepared food products have a moisture content of from about 35% to about 37% by weight.

48. A process for preparing corn based French fry strips, said process comprising the steps of:

preparing a corn based dough by mixing about 10% to about 30% by weight dry granular corn flour and about 0% to about 15% by weight dry granular corn meal having different granular sizes with about 50% to about 75% by weight water at an initial temperature of from about 40° F. to about 85° F., and mixing these constituents while elevating the temperature thereof to at least about 170° F. but such that the water does not boil;

extruding and cutting the corn based dough into elongated French fry strips having a size and shape resembling French fry strips cut from raw potatoes; and freezing the individually shaped food products.

49. The process of claim 48 wherein the corn based dough comprises from about 23% to about 25% corn flour, and from about 2% to about 4% corn meal.

50. The process of claim 48 wherein said dough preparing step comprises elevating the temperature of the constituents to a temperature of from about 180° F. to about 185° F.

51. The process of claim 48 further including a finish preparation step comprising the step of frying the frozen strips in hot oil at a temperature of from about 340° F. to about 365° F., for a time of from about 150 to about 300 seconds to produce finish fried strips having a moisture content of from about 30% to about 50% by weight.

52. The process of claim 51 wherein the finish fried strips have a moisture content of from about 35% to about 37% by weight.

53. The process of claim 48 further including the step of cooling the corn based dough prior to said cutting and extruding step.

54. The process of claim 48 wherein said extruding and cutting step comprises extruding the corn based dough into an elongated shape, reducing the temperature of the extruded dough to less than about 125° F. without freezing, cutting the extruded dough into elongated strips, and freezing at least the exterior surfaces of the strips.

* * * * *